Aug. 10, 1943.  H. H. MORETON  2,326,484
FILTERING APPARATUS
Filed Jan. 25, 1940  4 Sheets-Sheet 1
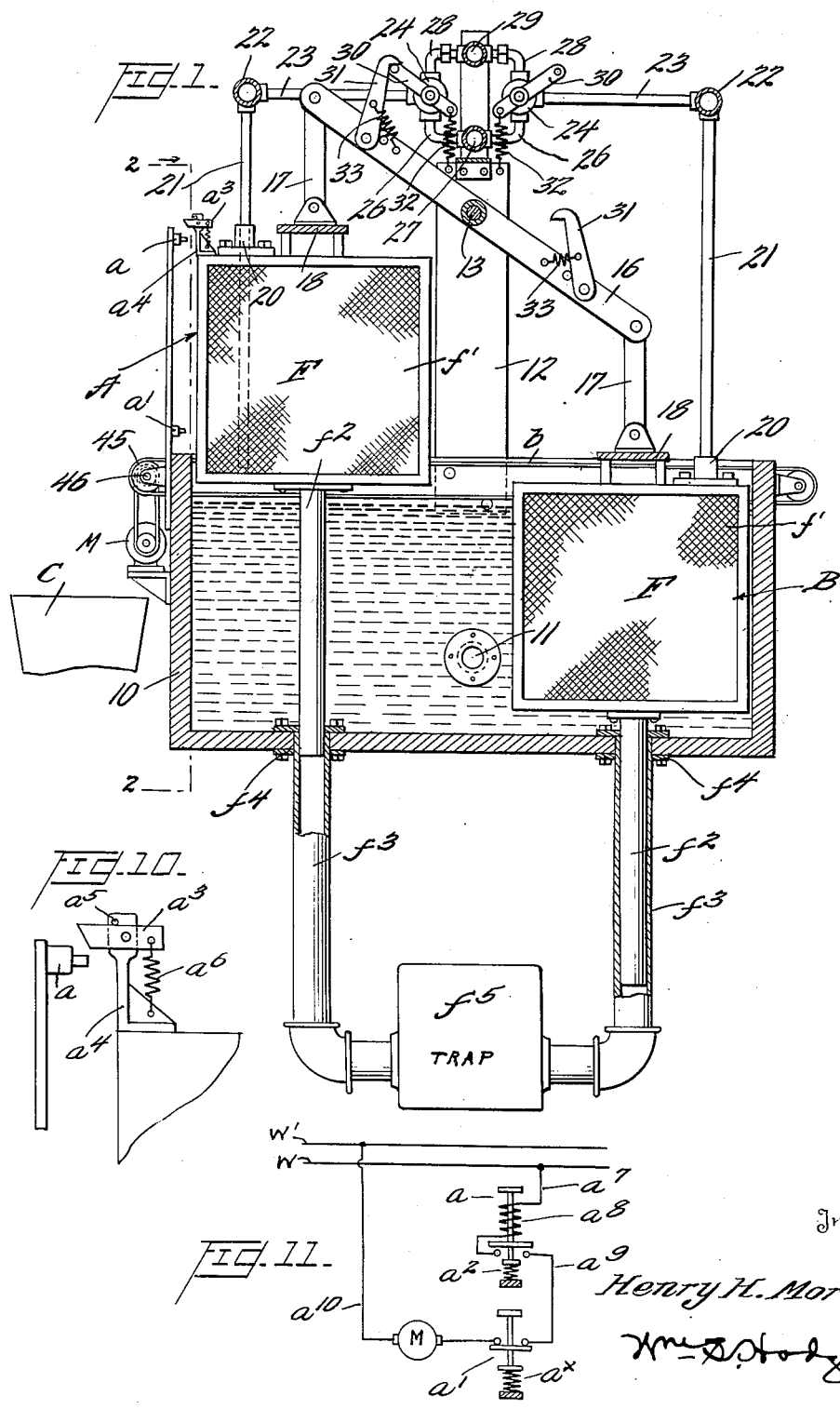
Inventor
Henry H. Moreton,
Wm D. Hodges
Attorney Aug. 10, 1943.    H. H. MORETON    2,326,484
FILTERING APPARATUS
Filed Jan. 25, 1940    4 Sheets-Sheet 2
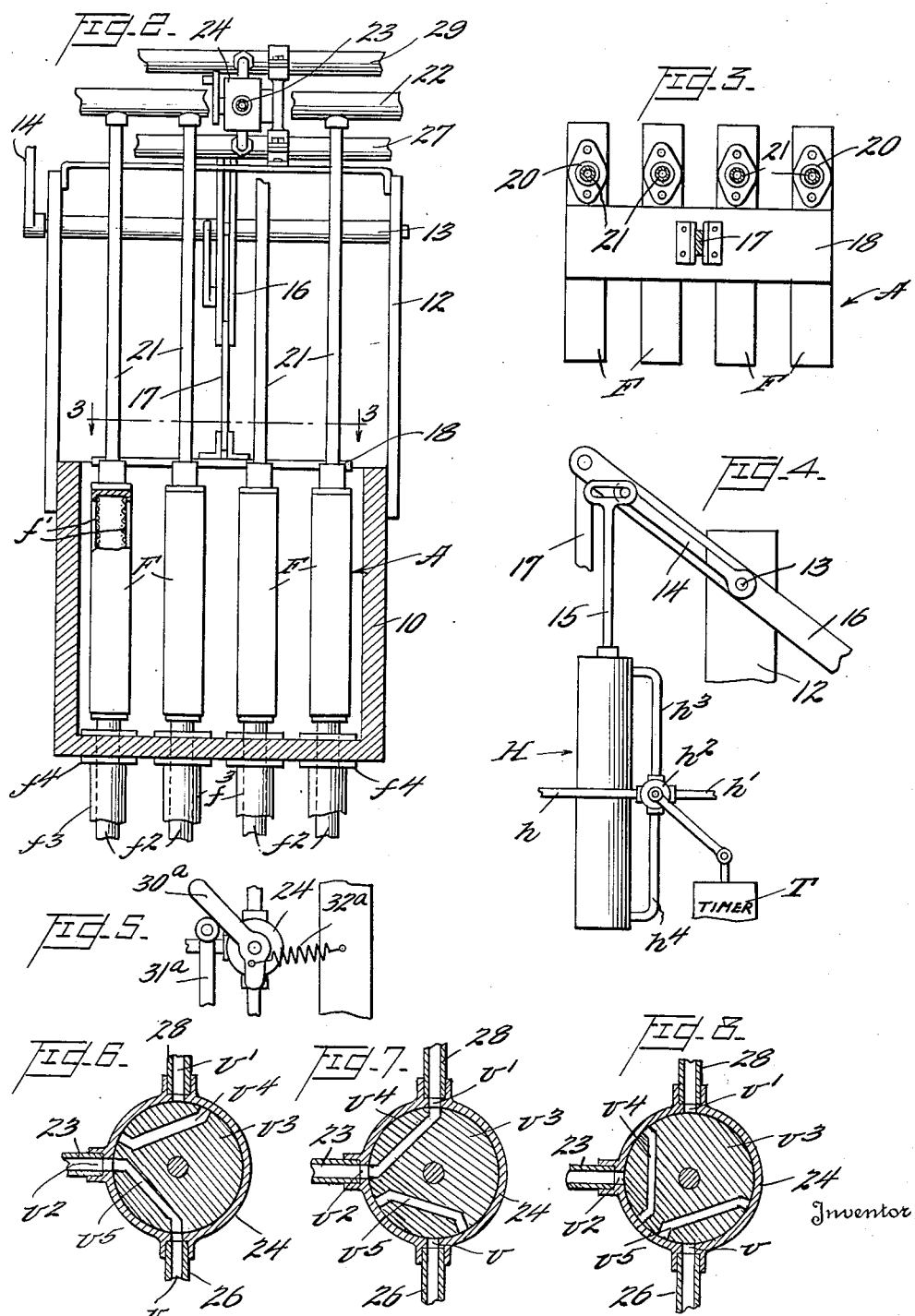
Inventor
Henry H. Moreton,
By
Wm S. Hodges
Attorney

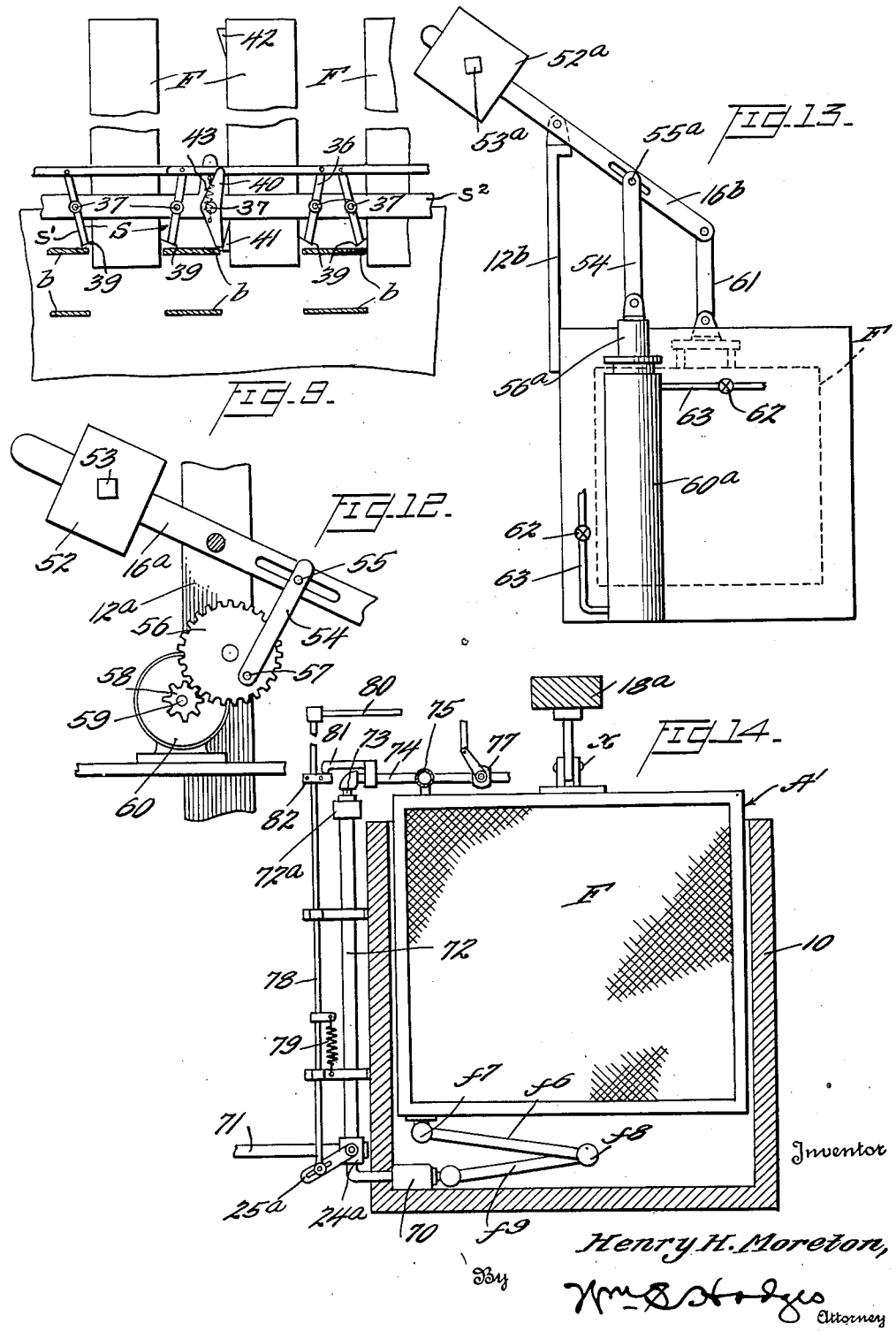

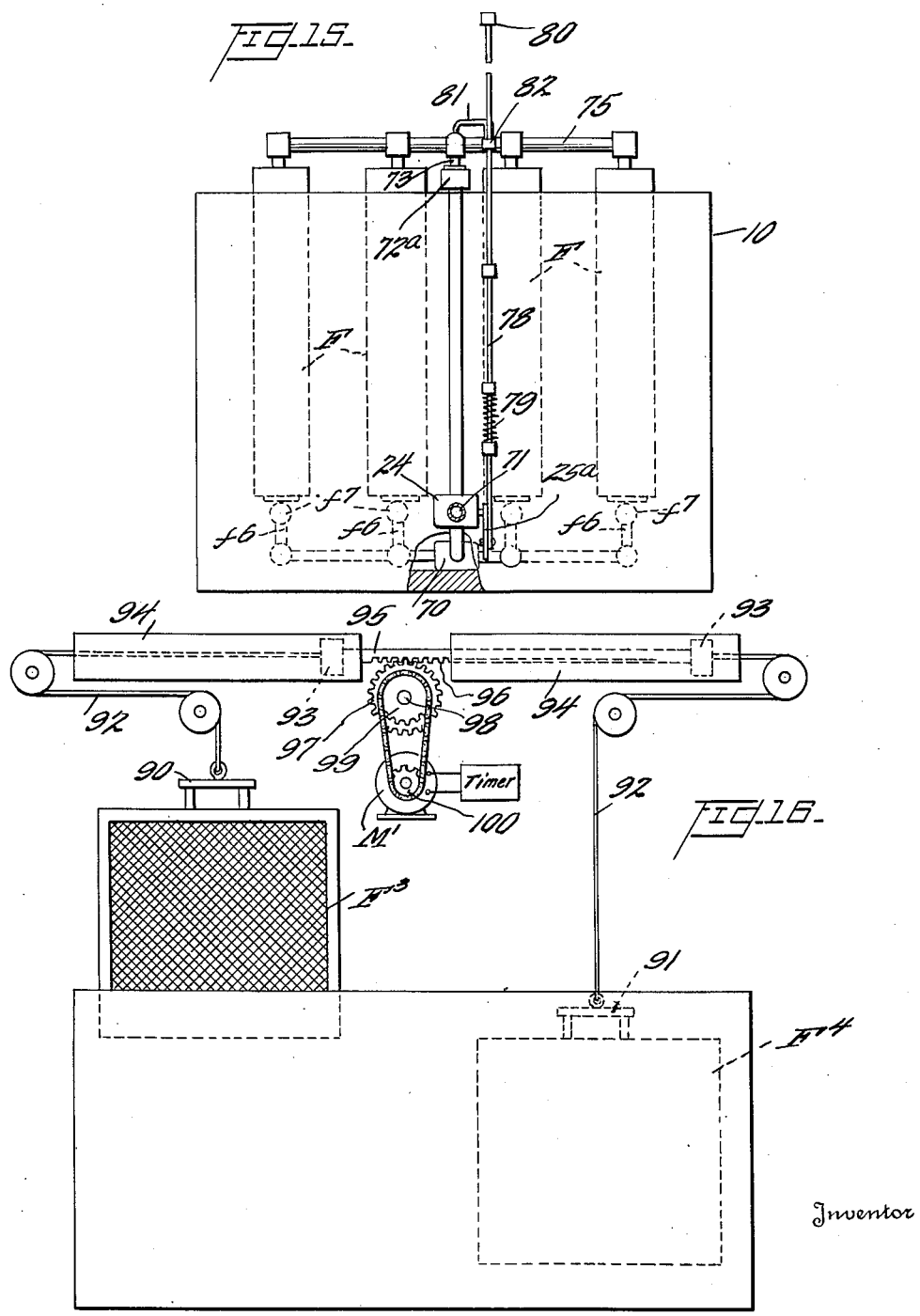

Patented Aug. 10, 1943

2,326,484

UNITED STATES PATENT OFFICE 2,326,484

FILTERING APPARATUS

Henry H. Moreton, Los Angeles, Calif.

Application January 25, 1940, Serial No. 315,584

18 Claims. (Cl. 210—153)

This invention is a filtering apparatus particularly designed for filtering sewage, although not limited in this particular, because it may be used to advantage in other fields of filtration.

One of the objects of the invention is to provide a filtering apparatus of simple and inexpensive construction, which will be capable of a very high efficiency in operation. A further object is to provide an apparatus of compact structure, in which filter units may be conveniently arranged for alternate operation, and in which the respective units may consist of a single filter cell or member, or a plurality thereof arranged in a group. A further object is to provide an improved filter cell or chamber, and means for moving it into and out of said chamber, so that it may be readily cleaned as conditions may require. A further object is to provide a pair of filter units, and means for alternately raising each unit as the other is lowered and vice versa, so that one unit may be cleansed while the other unit is in operation. A further object is to provide means for withdrawing moisture from each filter section at the end of the filtering operation of its unit, and means for loosening the residual coating on the surface of the section in a predetermined sequence. A further object is to provide means for removing the coated residual material from the surface of each filter section during movement of the filter unit into the tank.

This invention will be hereinafter fully set forth and particularly pointed out in the claims.

In the accompanying drawings:

Figure 1 is a vertical cross sectional view illustrating a filtering apparatus constructed in accordance with the invention. Figure 2 is a similar view on the line 2—2, Figure 1. Figure 3 is a top plan view of one of the filter units removed from the assembly. Figure 4 is a view illustrating one form of power means for imparting movement to the filter units. Figure 5 is a detail view illustrating a modification of the valve actuating means. Figures 6, 7 and 8 are detail sectional views respectively illustrating the three positions of the valve. Figure 9 is a detail view of the scraper devices. Figure 10 is a detail view illustrating one form of switch control for the conveyor motor. Figure 11 illustrates a typical diagram for said control. Figures 12 and 13 are side elevations illustrating modified forms of power means for imparting movement to the filter units. Figure 14 is a longitudinal sectional view illustrating a modification of the suction and fluid pressure elements. Figure 15 is a front view of the embodiment of Figure 14, with parts broken away and in section. Figure 16 is a diagrammatic view illustrating another modification.

Referring to the drawings, 10 designates a tank having an inlet pipe 11 leading from any suitable source of supply (not shown). Extending upwardly from the tank are supporting brackets 12 which sustain a rock shaft 13, which may be actuated in any suitable manner. It is preferred to utilize a power means which may be time controlled, and for the purposes of illustration the shaft 13 is provided with a crank arm 14, which is connected to the plunger arm 15 of an hydraulic lift H. Said lift is equipped with a pressure supply pipe $h$ and exhaust pipe $h'$, controlled by a valve $h^2$, with the usual branch pipes $h^3$ and $h^4$ leading to the respective ends of the cylinder $h^5$. Said valve may be controlled manually or by any well known form of timing device diagrammatically illustrated at T.

Connected with the rock shaft 13 is a rock-lever or walking beam 16, the ends of which are movably connected to plates 18 by means of links 17. A plurality of filter cells or members F are secured to said plate 18. In the drawings, each unit A and B consists of any desired number of the filter cells F arranged in a group, but for the purposes of illustration, each unit is shown as consisting of four filter cells. It will be readily understood from the drawings, that the walking beam connections 16 with the links 17 and plates 18 are of such a nature that as the unit A is elevated, the unit B is lowered and vice versa.

Each filter cell or member preferably consists of a frame $f$ of any desired shape, with any desired number of filter beds, a rectangular shape having been selected for purposes of illustration. Said frame is shown as provided with two relatively spaced filter beds $f'$, which may be of any suitable construction, such as perforated sheet material covered with filter cloth or any other known type of filtering material which may be readily attached to or detached from the frame, as occasion may require, to secure effective filtration, and which also will permit the up and down movement of the filter element and yet produce effective filtration. Leading from the bottom of each filter section F is a liquid-escape pipe $f^2$, which telescopes with a drain pipe $f^3$ depending from the bottom of the tank 10. A suitable stuffing box $f^4$ is provided in the bottom wall of the tank so as to maintain a liquid tight connection between the escape pipe $f^2$ and the drain pipe $f^3$. The drain pipes $f^3$ communicate with a trap $f^5$ which may be connected with the municipal sewerage system, but is preferably a common and well-known type of trap-construction capable of maintaining a predetermined liquid level therein at all times with a sealed inlet pipe. It will be observed that the pipes $f^2$ and $f^3$ are of sufficient length to permit the up and down movements of the filter units without destroying the sealed connection between the pipes, the arrangement being such that a gravitational flow of liquid from the interior of the filter element is obtained while the latter is submerged.

In the top of each of the frames $f$ is an opening provided with a stuffing box 20, through which a pipe 21 extends downwardly into the filter element F. The respective pipes 21 of each unit A or B are connected to a cross pipe 22, which in turn is connected by a supply pipe 23 controlled by a three-way valve 24. Therefore, there are two cross pipes 22, one for each unit, and one valve 24 for each unit. The valves may be of any desired construction, but for purposes of illustration the valve 24 is shown as provided with a casing having three ports $v$, $v'$ and $v^2$. The port $v$ is positioned to communicate with a branch 26 of a suction pipe 27, which is connected with any suitable means (not shown) for maintaining a vacuum therein. Each port $v'$ is connected to a branch pipe 28 connected with a pressure pipe 29 connected with any suitable means for maintaining a pressure higher than atmospheric pressure within said conduit. The port $v^2$ of each valve is arranged to connect with the supply pipe 23 leading to the cross pipe 22. The plug $v^3$ of the valve is provided with two passages $v^4$ and $v^5$, respectively, so arranged as to selectively control communication between pipes 27 and 29 and the various ports $v$, $v'$, $v^2$.

The valves 24 may be operated in any desired manner, but for purposes of illustration, the plug $v^3$ of each valve 24 is rotated by means of an arm 30 secured to the valve stem, and engageable by a pivoted latch member 31, mounted on the walking beam 16. Said operating arm 30 is biased by means of a spring 32 in such position as to normally maintain the passage $v^5$ of its valve 24 in communication with ports $v$ and $v^2$. The latch 31 is held to a normal engaging position by means of a spring 33. In operation, as the unit starts downwardly, the arm 25 is engaged by the hook portion of the latch 27, thereby rocking the arm 25 in such manner as to first close the valve completely and then to move passage $v^5$ to closed position and to place the passage $v^4$ in communication with the ports $v'$ and $v^2$, as the valve core continues to rotate, thereby establishing a very brief communication between pipe 29 and the interiors of the filter members. Continued downward movement of the unit will then move the valve core $v^3$ to such position as to close both passages $v^4$ and $v^5$ until the latch is disengaged from arm 30, whereupon spring 32 will reverse the movement of the plug so that it will stop in the position of Figure 6, which position is maintained as long as the cells of the unit are submerged in the liquid within the tank 10. At this time the interior of the filter element will be subjected to a slight suction, sufficient to draw the liquid into the interior of each filtering chamber while so submerged, but without destroying or interfering with the gravitational outflow of liquid from the chamber. During the reverse movement of the plug the filter will again be briefly subjected to the internal pressure shock while partially submerged, the effect of which will be to further clear the filter of softened residual material. Upward movement of the filter unit will not effect movement of the valve plug, but will cause the latch 31 to reengage its valve arm.

Another method of operating the valve 24 is illustrated in Figure 5, in which the valve 24 is shown as operated by means of an arm 30ª which is secured to the rotatable core $v^3$ of the valve, and is normally held by means of a spring 32ª in such manner as to maintain communication between pipe 27 and the interior of the cells through the valve ports $v$ and $v^2$. The arm 30ª is movable against the tension of an overthrow spring 32ª by means of a roller carried by a projection 31ª on the frame which connects the plurality of cells forming a filtering unit. The action of said member 31ª during its downward movement is to rotate arm 30ª and valve 24 until the spring 32ª passes the dead center, whereupon the valve is moved by said spring to a position which will close all ports. Upon its upward movement the member 31 rotates the arm 31ª and its valve in a reverse direction, until the spring 32ª acts to reverse the valve. During this downward movement the ports $v'$ and $v^2$ are connected for a short period of time, so as to establish a temporary communication between pipe 29 and the interiors of the cells F, and then the valve is moved to the position which connects the ports $v$ and $v^2$.

Naturally, the filtering surfaces of the cells F become coated with deposits of residual material, which deposits must be removed before the filters may again be used. In order to accomplish the cleansing of the filter surfaces during the up and down movements of the filter units, two series of scrapers S and S' are provided. Each scraper consists of an arm 36 pivotally mounted on a rock shaft 37 mounted in the frame $S^2$, said arms of each series being connected by a link 38, in such manner that all of them will move in unison. Each arm is provided at one end with a scraper 39. As shown in Figure 7, the rock shaft 37 of the series of scrapers S is provided with a cam 40, so positioned as to be engaged by a projection 41 carried on the lower end of one of the filter cells. Said cam is also positioned to be engaged also by a second projection 42, on the upper end of the same cell. A similar cam (not shown) is provided on the other side of the filter unit, as viewed in Figure 9, and operatively connected with the series of scrapers S', so as to be operated by duplicate projections 41 and 42 simultaneously with the operation of the scrapers S. It will be observed that as the filter unit is moved downwardly the scrapers are brought into engagement with the adjacent filter surfaces. An overthrow spring 43 is connected to the cam 40 in such manner that when the end of the cam passes the dead center, completion of the rotative movement of the shaft will be effected with a quick motion or snap motion. Thus, the scraper end of each is engaged with the adjacent surfaces of the cells, as the latter are lowered, so that the filter surfaces of the cells will be scraped and cleared of sediment during said downward movement of the unit. As the filtering unit moves upwardly the positions of the scrapers will be reversed, so as to move them away from the surfaces of the filter cells during the upward movement of the cells.

The scrapings of sediment may be disposed of in any desired manner, but for purposes of illustration, conveyor belts $b$ are employed, said belts being arranged to travel in the vicinity of the filter cells. Each belt extends around a suitable pulley 45, movable with a rotatively mounted shaft 46, located in a position extending transversely to the axes of the shaft 37, the other end of the belt being suitably supported by an idler in a manner well understood in the conveyor art.

Rotative motion is imparted to the shaft 46 in any desired manner, an electric motor M being shown for illustrative purposes, without intention to limit the invention. Operation of the motor may be controlled in any desired manner, an illustrative method being shown in Figures 10 and 11, also without intent to limit the invention in this respect. Referring to said figures, the circuit to the motor M is controlled by two switches $a$ and $a'$ respectively, supported in vertically spaced relation above the tank 10. The switch $a$ is biased to normally open position by means of a spring $a^2$ and the switch $a'$ is biased to normally closed position by a similar spring $a^x$. The circuit to the motor is from line wire W through wire $a^7$, solenoid coil $a^8$ to one of the contacts of the switch $a$. The other contact of said switch is connected by a wire $a^9$ with one of the contacts of the switch $a'$, the other contact of the last mentioned switch being connected with the motor M, the return from the motor being through wire $a^{10}$ to wire W'. The switches are operated by means of a trigger $a^3$ pivoted to a support $a^4$ carried by one of the filter units, such as filter unit A, said trigger being normally biased against a stop $a^5$ by means of a spring $a^6$. The arrangement is such that the bevel end of the trigger will operate the two switches $a$ and $a'$ respectively, during downward movement of the filter unit, but will trip past the switches during the return movement. As the trigger moves downwardly, it will first close switch $a$ against the tension of its spring, thereby closing the circuit to the motor through switches $a$ and $a'$. At the same time the solenoid coil $a^8$ is energized, holding the switch $a$ in normally closed position against the tension of its spring $a^2$. As the trigger travels downwardly, it will move switch $a'$ against the tension of its spring $a^x$, thereby breaking the circuit to the motor and deenergizing the solenoid coil $a^8$, so that the spring $a^2$ may move the switch $a$ to circuit breaking position. As the trigger travels downwardly past the switch $a'$, the spring $a^x$ restores said switch to the circuit closing position, but this will not affect the circuit because the switch $a'$ will have been previously moved to circuit breaking position at the time that the circuit is broken at switch $a'$, and the switches will then be set for the next operation. As the motor is energized, the belts $b$ are operated so as to convey the scrapings from the filter surfaces to the left, as viewed in Figure 1, and to discharge them into a suitable receptacle, such as a car C. During the filtering stage, the motor remains inoperative, and as stated above is not energized during upward movement of the filter. In other words, the motor is only operated during the downward travel of the filter unit.

The belts $b$ are arranged to discharge the scrapings in a well known manner. If desired, the discharge may be arranged so as to deposit the residual material into a car C, mounted on tracks arranged in the vicinity of the tank 10, or any other means of disposal well understood in the art may be substituted for the car.

It will be readily understood that the two units A and B are so connected to the walking beam 16 as to act as counterbalances for each other. Therefore, the units may be raised and lowered at the expenditure of a minimum amount of power, the weight of each unit counterbalancing the weight of the other unit. Where it is desired to use an installation equipped with a single filter unit consisting of a plurality of filtering cells F, it is advantageous to provide means for counterbalancing the weight of the unit, as it is raised and lowered. In Figure 12 is illustrated an arrangement by which the counterbalancing functions of a single unit are obtained. Referring to said figure, $16^a$ designates the walking beam which is pivoted to the support $12^a$ and is connected at one end (not shown) with the filter unit. The other end of the walking beam is provided with an adjustable counterweight 52 which is slidably mounted upon the walking beam, and suitably held in any adjusted position, a set screw 53 being shown for purposes of illustration. The beam $16^a$ is rocked by means of a link 54 having one end loosely connected at 55 to the walking beam $16^a$, and the other end pivoted to one side of a driven gear 56, as indicated at 57. The gear 56 is actuated by a drive gear 58 mounted on a suitable power shaft 59. The power source may be any desirable form of motor, but for purposes of illustration an electric motor is diagrammatically indicated at 60.

Another counterbalancing arrangement is shown in Figure 13, in which the walking beam $16^b$ is pivoted to the support $12^b$, and is provided at one end with a counterweight $52^a$, slidable along the walking beam, and held in any adjusted position by means of the set screw $53^a$. The filter unit F is shown as connected by a suitable link 61. The power means consists of an hydraulic cylinder $60^a$, the piston $56^a$ of which is provided with a link 54. The other upper end of said link is loosely connected to the walking beam, as indicated at $55^a$. The admission of fluid pressure to cylinder $60^a$ is controlled by means of the valve 62 in the pipes 63.

In operation, the fluid to be filtered is introduced into the tank 10 through the inlet 11, preferably with sufficient force to create a turbulent condition, whereby the solids are kept well suspended in the fluid by agitation. In the form illustrated in Figure 1, it will be observed that one filter unit will be submerged within the contents of the tank 10, while the other one is lifted entirely free thereof, the general idea being that the filter units are alternately submerged and allowed to stand a predetermined period, and then withdrawn from the tank. As the submerged unit is raised, the other unit is lowered, the weight of each unit counterbalancing the weight of the other. The arrangement of the valves 25 is such that while a unit is submerged, there is an internal suction applied to the filter cells thereof from conduit 27, through pipe 21, in such manner as to tend to draw the liquids through the filter surfaces into the interior of each cell, the liquid being constantly discharged by the action of gravity through the pipes $f^2$ and $f^3$ into the tank $f^5$. The outward flow of liquid also tends to create a suction within the cells. At the end of the predetermined period, whether the latter is determined automatically or is controlled manually, the submerged unit will be elevated and the other unit will be lowered. During the travel of the two units to their new positions, the valves 24 are operated, so that as heretofore described the valve 24 of the downwardly travelling unit will first cut off the suction pipe 29, then direct a short blast of compressed air from the pipe 29 into the unit during downward movement thereof; then closing the valve to all passages; and finally placing the filter in connection with the suction pipe. The internal compressed fluid shock to the filter surfaces loosens any residual matter gathered from a previous filtering operation and which may be adhering to said surfaces. At the same time the scrapers S are operated by the cam 40 in such manner as to cause scrapers to engage the surfaces of the unit which is being lowered, so that any residue which may still be adhering to the filter surfaces, may be scraped off and deposited upon the belts B. Within a very short interval after the initiation of the downward movement to the unit being lowered, the valve 25 is operated so as to open the interiors of the cells of the downwardly traveling unit to the influence of the suction in the pipe 30. After the predetermined period of filtration, the last lowered unit is raised and the other unit lowered, and the operations above described are repeated, except that they are reversed with respect to the two units.

Figures 14 and 15 are views of a modification of the arrangement of the structure illustrated in Figure 1, and particularly with respect to the means for applying the suction from the pipe 27 and for applying the pressure from pipe 29, together with a modified means for operating the valves. Referring to said figure, the tank 10 and the filter unit A' are of substantially the same construction as already described, the unit consisting of any desired number of filter cells F which may be raised and lowered in any desired manner, as for instance, by means of the lifter bar 18ª pivotally connected with filter cells, as indicated at X and raised and lowered by any of the means heretofore described. In lieu of the telescoping pipes $f^3$ and $f^4$, illustrated in Figures 1 and 2, the outlet of each filter cell is connected with a jointed outlet pipe $f^6$, one end $f^7$ being connected to the outlet of the filter element and the other end $f^8$ being connected with a conduit $f^9$ leading to a reducing valve 70 (diagrammatically illustrated) arranged to communicate with a sewer pipe line 71. Interposed between the reducing valve 70 and the pipe 71 is a three-way valve 24ª which may be of a construction similar to that of the valve 24 already described. Said valve 24ª is operated by means of an arm 25ª.

Leading upwardly from the three-way valve 24ª is a conduit 72 provided with a stuffing box 72ª at its upper end, and telescoping and slidably mounted within the pipe 72 is another pipe 73, which is connected by means of a branch 74 with the cross pipe 75 extending across the tops of the filter cells, and having branches communicating with the interiors of the respective cells. Also connected to the cross pipe 75 is a supply pipe 76 connected with a suitable source of compressed air (not shown) and controlled by a manual valve 77. The telescoping pipe 73, branch 74 and cross pipe 75 are of sufficient rigidity to cause the pipe 73 to move up and down in telescoping relation with the pipe 72 during the up and down movements of the filter units.

The valve arm 25 is operated by a rod 78, slidably mounted in suitable guides on the outside of a wall of tank 10, and is normally held with the valve arm 25ª depressed by means of the spring 79. Said rod is provided with an arm 80 which is engaged by the top of the filter unit during travel of the latter while being raised from the tank 10, and in such manner as to move the arm 25ª, and to correspondingly move and sustain the valve 24ª against the tension of the spring 79. If positive return of the valve is desired, the same may be effected by means of a member 81 secured to the pipe 74, and so positioned that during downward movement of the filter unit, said member will engage a tappet 82 secured to the rod.

The arrangement is such that while a filter unit is submerged within the chamber 10, the interior of the respective filter cells are subjected to the slight suction which is applied through the cross pipe 75, the branch pipe 74, telescoping pipe 73, together with the pipe 72, the valve 24ª, reducing valve 70 and the branches $f^6$ and $f^7$. While the battery of cells is being lifted, contact is made with the arm 80, causing the rod 78 to be shifted upwardly with the travel of the cell unit, the effect of which is to first close the connection between the pipes 72 and $f^6$ and $f^7$ by adjusting the position of the valve 24ª, but leaving the circuit open from pipe 71 through valve 24ª, pipes 72 and 73, branch pipe 74, cross pipe 75 and the interiors of the respective filter cells. In this way, full negative pressure is available for drying. While the cell is being lowered, the valve action of the valve 24ª is reversed and the cells are subjected to a low vacuum from pipe 71, valve 22ª, reducing valve 70, and the folding pipes $f^6$ and $f^7$. After the cell has been lifted and the drying period has passed, the cell is caused to descend into the tank. During the first few inches of its travel the rod 78 is caused to reversely operate the valve 24ª in a manner to close the valve for a very short period of time, during which period the valve 77 may be opened to introduce a blast of compressed air into the interiors of the cells, for the purpose of loosening the cake or blowing it off the filtering surfaces. Scrapers, such as already described, may also be employed. The valve 77 is open only during the passage of the cell downwardly for a few inches, after which the valve is moved to the position to permit the light vacuum to reach the interiors of the cells in the manner above described.

In Figure 16 is diagrammatically illustrated a modification of the means for alternately raising and lowering the filter units. Referring to said figure, the filter units $F^3$ and $F^4$ are respectively provided with lifter bars 90 and 91, to each of which is connected a cable or other flexible member 92, arranged to travel over suitably located pulleys 83. The arrangement is such that each filter unit is raised as the other one is lowered, the power for effecting these units being connected in suitable manner to either unit. For illustrative purposes, each cable is connected to a head 93 slidably mounted within a cylindrical chamber 94, said heads being connected by an actuator bar 95 provided with rack teeth 96. Said teeth are engaged by a pinion 97 mounted on a shaft 98 and actuated by a sprocket wheel 99 connected by a suitable chain with a complemental sprocket wheel 100, driven by a motor M'. The motor is controlled in any desired manner, a time-controlled switch of any standard make being diagrammatically shown for purposes of illustration. In operation, each unit counterbalances the other and downward movement of each is cushioned by its plunger head 93.

Having thus explained the nature of the invention and described an operative manner of constructing and using the same, although without attempting to set forth all of the forms in which it may be made, or all of the forms of its use, what is claimed is:

1. A filtering apparatus comprising a tank for the material to be filtered, a chambered filter element provided with one or more filter walls, means for moving the filter element into and out of said tank along an approximately rectilinear path, a liquid outlet conduit having a portion connected to the bottom of and movable with said filter element and communicating with the interior of the latter so as to normally create a gravitational flow of filtered liquid from the filter element while the latter is submerged, a suction pipe connected with the interior of the filter unit, a valve controlling said suction pipe and normally biased to open position, whereby a constant flow of liquid is maintained through the filter element during said submergence, and means for controlling said valve.

2. A filtering apparatus comprising a tank for the material to be filtered, a chambered filter element provided with one or more filter walls, means for moving the filter element into and out of the tank along an approximately rectilinear path, a liquid outlet conduit consisting of two telescoping movable members one of which is connected to the bottom of and movable with the filter element and communicating with the interior of the latter so as to create a gravitational flow of filtered liquid from the fitler element while submerged, a suction pipe connected with the interior of said filter unit, said valve being normally biased to open position whereby a constant flow of liquid is maintained through the filter element during said submergence, and means for controlling the operation of said valve.

3. A filtering apparatus comprising a tank for the material to be filtered, a chambered filter element provided with one or more filter walls, means for moving the filter element into and out of said tank along an approximately rectilinear path, a liquid outlet conduit having a portion connected to the bottom of and movable with said filter element and communicating with the interior of the latter so as to normally create a gravitational flow of filter liquid from the filter element while the latter is submerged, a suction pipe connected with the interior of the filter unit, a valve controlling said suction pipe and normally biased to open position whereby a constant flow of liquid is maintained through the filter element during said submergence, means also connected with said valve for neutralizing the pressure reduction as the filter element is moved out of the tank, and means for controlling the operation of said valve.

4. A filtering apparatus comprising a tank for the material to be filtered, a chambered filter element provided with one or more filter walls, means for moving the filter element into and out of the tank along an approximately rectilinear path, an outlet conduit connected with the bottom of the filter unit at all times so as to create a gravitational flow of filtered liquid from the filter element while the same is submerged, a suction pipe at all times connected with the interior of said filter element, a normally open control valve for said pipe, so as to normally maintain a suction pressure within the filter chamber while submerged, and means operated by the filter-element-moving means during lowering movement of the filter element for temporarily closing said valve as the filter element moves toward said liquid.

5. A filtering apparatus comprising a tank for the material to be filtered, a chambered filter element provided with one or more filter walls, a pivotally supported lever provided with means for supporting said filter element, a liquid outlet conduit connected with the bottom of the filter element so as to normally create a gravitational flow of filter liquid from the filter element while it is submerged, means for rocking said lever so as to raise and lower the filter element into and out of said tank, a suction pipe connected with the interior of said filter element at all times, a control valve for said pipe biased to open position, so as to normally maintain a suction pressure within said chamber while it is submerged, and means carried by said lever for temporarily closing said valve as the filter element begins its travel toward the liquid.

6. A filtering apparatus comprising a tank for the material to be filtered, a chambered filter element provided with one or more filter walls, means for moving the filter element into and out of the tank along an approximately rectilinear path, a liquid outlet conduit connected at all times with the bottom of said filter element so as to normally create a gravitational flow of filter liquid from the filter element while submerged, means for maintaining a moderate reduction of pressure within the filter element during submergence thereof, pressure means, and means connected with the filter-element-moving means for temporarily connecting said pressure means with said filter element as the latter moves toward the liquid, so as to project an air blast of short duration into said chamber to loosen the filter cake clinging to the filter walls.

7. A filtering apparatus comprising a tank for the material to be filtered, a chambered filter element provided with one or more filter walls, means for moving the filter element into and out of the tank along an approximately rectilinear path, a liquid outlet conduit connected with the bottom of said filter element so as to normally create a gravitational flow of filter liquid from the filter element while submerged, means for maintaining a moderate reduction of pressure within the filter element during submergence thereof, a fluid pressure pipe having means for communicating with the interior of said filter element, a control valve for said pressure pipe, and means connected with the filter-element-moving means for actuating said valve during downward movement of the filter element so as to project an air blast of short duration into the filter chamber so as to loosen the filter cake adhering to the filter walls.

8. A filtering apparatus comprising a tank for the material to be filtered, a chambered filter element provided with one or more filter walls, a pivotally mounted lever, means for suspending the filter element from said lever, means for actuating said lever so as to move the filter element into and out of the tank, a liquid outlet connected with the bottom of the filter element at all times so as to create a gravitational flow of filtered liquid from the filter element while submerged, means for maintaining a moderate reduction of pressure within the filter element during submergence thereof, a fluid pressure pipe connected with said filter element, a valve controlling the same, and means carried by said lever for periodically operating said valve during downward movement of the filter element so as to project an air blast of short duration into the chamber to loosen the filter cake adhering to the filter surfaces.

9. A filtering apparatus comprising a tank for the material to be filtered, a chambered filter element provided with one or more filter walls, means for moving the filter element into and out of the tank along on approximately rectilinear path, an outlet conduit connected with the bottom of the filter unit at all times and so as to create a gravitational flow of filtered liquid from the filter element while the same is submerged, a suction pipe at all times connected with the interior of said filter element, a fluid pressure pipe, a single valve controlling both of said pipes biased to normally maintain a suction pressure within the filter chamber while submerged, and means movable with said filter element for actuating said valve, the latter being provided with means to open and close said fluid pressure pipe and said suction pipe in predetermined sequence and at predetermined intervals.

10. A filtering apparatus comprising a tank for the material to be filtered, a chambered filter element provided with one or more filter walls, means for moving the filter element into and out of the tank along an approximately rectilinear path, an outlet conduit connected with the bottom of the filter unit at all times and so as to create a gravitational flow of filtered liquid from the filter element while the same is submerged, a suction pipe having a delivery branch extended into and communicating with the interior of said filter element, the latter being movable relatively to said delivery branch, a fluid pressure pipe, a single valve controlling both of said pipes, means for biasing said valve to open connection between the suction pipe and the filter, means movable with the filter element and operable during the downward movements thereof for actuating said valve, said valve being provided with means to open and close said fluid pressure pipe and said suction pipe in predetermined sequence during said downward movements.

11. A filtering apparatus comprising a tank for the material to be filtered, a chambered filter element provided with one or more filter walls, means for moving the filter element into and out of the tank along an approximately rectilinear path, an outlet conduit connected with the bottom of the filter unit at all times and so as to create a gravitational flow of filtered liquid from the filter element while the same is submerged, a suction pipe at all times connected with the interior of said filter element, a fluid pressure pipe, a single valve controlling both of said pipes, means operated in timed relation with the movements of said filter element for actuating said valve, the latter being provided with means to open and close said fluid pressure pipe and said suction pipe in predetermined sequence and at predetermined intervals during its operation, means for biasing said valve to open connection between the suction pipe and the filter, so as to maintain a suction within the filter chamber while submerged, an operating arm for said valve, and a trip pawl mounted on said lever and normally biased to a position to engage said arm during downward movement of the filter element, so as to temporarily close the suction pipe and to temporarily open the pressure pipe.

12. A filtering apparatus comprising a tank for the material to be filtered, a plurality of filter units each consisting of one or more chambered filter elements, each filter element having one or more filter walls, means for moving the filter units into and out of the tank in alternate sequence and in such manner that as one unit moves into the tank another unit is moved out of the tank, a liquid outlet conduit connected with the interior of each of the filter elements at the bottom thereof so as to provide a gravitational outflow of liquid from the filter element while it is submerged, a suction pipe connected with the interior of all of the filter units, a valve controlling said suction pipe and normally biased to open position whereby a moderate reduction of pressure is maintained in all of the filter elements while submerged, and means for controlling the operation of said valve.

13. A filtering apparatus comprising a tank for the material to be filtered, two filter units each consisting of one or more chambered filter elements, each filter element having one or more filter walls, means for moving the filter units into and out of the tank in alternate sequence and in such manner that as each moves into the tank the other is moved out of the tank, a liquid outlet conduit connected with the interior of each filter element at the bottom thereof so as to provide a gravitational outflow of liquid from the filter element while it is submerged, a suction pipe, branch pipes connecting the suction pipe with the filter element, a valve controlling communication between the suction pipe and said branch pipes, said valve being biased to normally open position, valve actuating means connected to and movable with the filter units for intermittently moving said valve in one direction to temporarily close the suction pipe, and means also controlled by said valve for independently neutralizing the pressure reduction in each filter unit as it moves into the tank.

14. A filtering apparatus comprising a tank for the material to be filtered, two filter units each consisting of one or more chambered filter elements, each filter element having one or more filter walls, means for moving the filter units into and out of the tank in alternate sequence and in such manner that as each unit moves into the tank the other is moved out of the same, a liquid outlet conduit connected with the interior of each of the filter elements at the bottom thereof, so as to provide a gravitational outflow of liquid from the filter elements while the unit is submerged, a suction pipe, two sets of branch pipes one set for each filter unit, connecting the suction pipe with the respective filter elements of a unit, a pressure pipe, two sets of branch pipes one set for each unit, connecting the pressure pipe with the respective filter elements of the same unit, a control valve for each filter unit located between the suction and the pressure pipes, and the respective branch pipes of the unit, each valve being biased to normally maintain communication between the suction pipe and the respective filter elements of its unit, valve operating means for the respective valves, and means for actuating each valve operating means during inward movement of its associated filter unit so as to operate the valve in one direction during such inward movement, each valve having means to first temporarily close the suction pipe and also to open the pressure pipe during said inward movement of the filter unit.

15. A filtering apparatus comprising a tank for the material to be filtered, two filter units each consisting of one or more chambered filter elements, each element being provided with one or more filter walls, means for moving the filter units into and out of the tank in alternate sequence and in such manner that as each unit moves into the tank the other is moved out of the same, a liquid conduit connected with the interior of each of the filter elements at the bottom thereof, so as to provide a gravitational outflow of liquid from the filter elements while the unit is submerged, a suction pipe, two sets of branch pipes, one set for each filter unit, connecting the suction pipe with the respective filter elements of a unit, a pressure pipe, two sets of branch pipes, one set for each unit, connecting the pressure pipe with the respective filter elements of the same unit, a control valve for each filter unit located between the suction and the pressure pipes and the respective branch pipes for the unit, each valve being biased to normally maintain communication between the suction pipe and the respective filter elements of the unit, and valve actuating means for each of said valves and carried by the filter moving means so as to be operable during inward movements of the associated filter unit, each valve having means for opening and closing the suction and the pressure pipes in predetermined sequence during said inward movements of the respective filter units.

16. A filtering apparatus comprising a tank for material to be filtered, a lever pivotally supported in a position above said tank, a pair of filter units each consisting of a filter element provided with a chamber having one or more filter walls, means connecting the ends of the lever with the respective filter units, a filtrate outlet conduit leading from the bottom of said chamber, outlet pipes respectively telescoping with said conduits, each outlet conduit and the pipe telescoping therewith providing means for effecting a continuous gravitational flow outlet for the filter chamber while the latter is submerged within the material to be filtered, means for rocking said shaft in such manner that the filter units are alternately moved into and out of said tank, a suction pipe, a compressed air pipe, two sets of branch pipes one set for the chambers of each filter unit, and extending into said chambers thereof, two valves each connected with the suction pipe and the compressed air pipe, there being one valve for each filter unit, each valve being connected with said branch pipes of its unit, said valves each having means for selectively establishing communication between the suction pipe or the air pressure pipe and said branch pipes of its unit in a predetermined sequence, and means carried by and movable with said lever for actuating said valve in such manner as to selectively establish said time sequenced communications.

17. A filtering apparatus comprising a tank for the material to be filtered, a filter consisting of a chamber provided with one or more filter walls, a liquid outlet conduit leading from said chamber, means for moving the filter into and out of said tank in such manner that while the filter is within the tank it will be submerged within said material, pivotally mounted scraper members, one for each filter wall each having a portion positioned to engage said wall, relatively spaced cam members carried by the filter, actuating means for the scraper members positioned in the paths of movement of said cam members and so located as to be operated to alternately move the scrapers into and out of engagement with the adjacent filter walls during movements of the filter.

18. A filtering apparatus comprising a tank for the material to be filtered, a plurality of filter elements each consisting of a chamber provided with oppositely disposed filtering walls, a liquid outlet conduit leading from each chamber, means for moving the filter elements into and out of the tank as a unit and in such manner that while the filter is within the tank it will be submerged within said material, two sets of pivotally mounted scraper members each having a portion engageable with a filter surface, there being separate sets of scrapers for the oppositely located filter surfaces, means for moving the scraper elements into and out of engagement with the adjacent filter surfaces, means carried by the filter elements for periodically actuating said scraper-element-moving means to bring the scrapers into and out of engagement, respectively, with the said adjacent filter surfaces, belts located below the scrapers, and means for imparting intermittent movements to the belts.

HENRY H. MORETON.